US006282084B1

United States Patent
Goerdt et al.

(10) Patent No.: US 6,282,084 B1
(45) Date of Patent: Aug. 28, 2001

(54) TRANSPORTABLE SUPPORT APPARATUS FOR PORTABLE COMPUTERS

(75) Inventors: Daniel Richard Goerdt; Eugene Arthur Leitner, both of Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/255,221

(22) Filed: Feb. 22, 1999

(51) Int. Cl.[7] ...................................................... H05K 7/14
(52) U.S. Cl. ........................... 361/683; 361/681; 361/682; 248/639; 248/177.1; 248/178.1; 248/652; 248/676; 312/223.1; 312/223.2; 108/115; 108/135
(58) Field of Search ............................ 361/683, 680–682, 361/684–686; 248/639, 177.1, 178.1, 637, 652, 676, 188.6, 188; 312/223.1, 223.2, 223.3; 108/115, 123, 128, 135

(56) References Cited

U.S. PATENT DOCUMENTS

| 4,061,302 | * | 12/1977 | Boone ................................. 248/170 |
| 4,159,071 | * | 6/1979 | Roca ................................... 297/163 |
| 4,691,610 | * | 9/1987 | Gilbert ................................. 84/327 |
| 4,830,328 | | 5/1989 | Takach, Jr. et al. ................. 248/639 |
| 5,337,657 | * | 8/1994 | Diffrient ............................. 108/115 |
| 5,362,025 | * | 11/1994 | Trom et al. ......................... 248/670 |
| 5,485,793 | * | 1/1996 | Crowell ................................. 108/44 |
| 5,973,917 | * | 10/1999 | White ................................. 361/683 |
| 5,992,805 | * | 11/1999 | Tanner ................................. 248/161 |
| 6,189,845 | * | 2/2001 | Chen ................................. 248/177.1 |

OTHER PUBLICATIONS

Lapstand Inc., Product literature dated May 28, 2001.*
*Instructions for the LapStand™.*
Lapstand Inc., Untitled Product Literature Documents, http://www.lapstand.com, downloaded 03–08/99, (4 pages).
LAPSTAND™ Product Literature, http://www.lapstand.net/ Pages, Frontline Group, Beverly, Maine, (1998), downloaded 03–08/99, 4 pages.
John Eckberg, "Laps, legs due some relief", *The Cincinnati Enquirer*, Business Section, (03–07/99), pp. E1–E2.

* cited by examiner

Primary Examiner—Leo P. Picard
Assistant Examiner—David Foster
(74) Attorney, Agent, or Firm—Wood Herron & Evans (57) ABSTRACT

A support apparatus for portable computers utilizes a plurality of legs removably coupled to a pedestal that incorporates a storage compartment within which the plurality of removable legs may be stored when not in use. By incorporation of a storage compartment within the pedestal, the overall bulk of the support apparatus is reduced, and furthermore, the removable legs are retained in such a manner that all components of the support apparatus can be transported as a unit.

21 Claims, 6 Drawing Sheets

TRANSPORTABLE SUPPORT APPARATUS FOR PORTABLE COMPUTERS

FIELD OF THE INVENTION

The invention is generally related to a support apparatus such as a stand or table, and in particular, to a support apparatus for use in supporting a portable computer.

BACKGROUND OF THE INVENTION

As people have become more mobile in their personal and business endeavors, as well as more dependent on computer technology, the need for portable computers has steadily increased. A wide variety of types of portable computers have been developed to meet this need, including laptop or notebook computers, sub-notebook computers, palm-type computers, hand-held computers, etc. Many laptop computers, for example, have many of the same performance characteristics of traditional desktop computers, but use a clamshell-like case that can be closed when the computer is not in use to facilitate storage and transportation of the computer.

Portable computers have an innumerable number of uses. For example, portable computers are often used during business or leisure travel, e.g., while waiting in an airport, or in a car, airplane or train. Portable computers are also useful for taking notes during meetings or classes, for giving business presentations, or just about any time a user needs to use a computer away from his or her home or office.

One drawback to many portable computers, and in particular most laptop computers, is that often these computers need to be supported on a desk or table or a similar location that positions the computer at a convenient height and location to enable a user to interact with the keyboard and/or pointing device for the computer and view the display. In many instances, however, a desk or table may not be available to the user, and the user may be forced to place the computer on his or her lap, on a chair, on a floor, or in another relatively inconvenient location. In these situations, the user often finds it much more difficult to use the computer, decreasing that user's productivity. In some circumstances, the user may choose to not even bring along the computer at all if it is anticipated that no suitable support location will be available in a given situation.

To alleviate some of these difficulties, computer supports and stands have been used in the past to support a portable computer on a support surface. For example, some laptop computers include fold-out legs that incline the rear of the computer to tilt the keyboard to a more comfortable orientation. These legs are typically only one or two inches long, and thus require the same type of support surfaces mentioned above.

In addition, computer stands have been developed to support a portable computer on a support surface such as a floor. One specific type of stand utilizes a flat plate that functions as a pedestal for supporting a portable computer on a conventional tripod. The tripod's legs may be collapsible in much the same manner as a camera tripod, with each leg having multiple elongate sections joined in a telescoping arrangement. One drawback of such a stand, however, is that the stand, when not in use, is relatively bulky and difficult to transport. And while the plate and the tripod may be removable from one another, separation of such components only presents a user with more parts to transport.

Therefore, a need continues to exist in the art for an improved manner of supporting a portable computer, particularly one that avoids the additional bulk and inconvenience associated with conventional computer supports.

SUMMARY OF THE INVENTION

The invention addresses these and other problems associated with the prior art by providing a support apparatus that utilizes a plurality of legs removably coupled to a pedestal that incorporates a storage compartment within which the plurality of removable legs may be stored when not in use. By incorporation of a storage compartment within a pedestal, the overall bulk of the support apparatus is reduced, and furthermore, the removable legs are retained in such a manner that all components of the support apparatus can be transported as a unit. As such, the support apparatus can be broken down into a relatively compact unit that is better suited for transportation along with a portable computer than other conventional options.

The pedestal in a support apparatus consistent with the invention is used to support a portable computer on a support surface such as a floor or table, or simply on the ground. In some embodiments, the portable computer merely rests on the pedestal. In the alternative, any number of securing mechanisms may be used to removably secure the computer to the pedestal. Further, in other embodiments, the support apparatus may be integrated directly into the base of a portable computer.

These and other advantages and features, which characterize the invention, are set forth in the claims annexed hereto and forming a further part hereof. However, for a better understanding of the invention, and the objectives and advantages obtained thereby, reference should be made to the Drawings, and to the accompanying descriptive matter, in which there is described specific embodiments of the invention.

DETAILED DESCRIPTION

Figure 1:
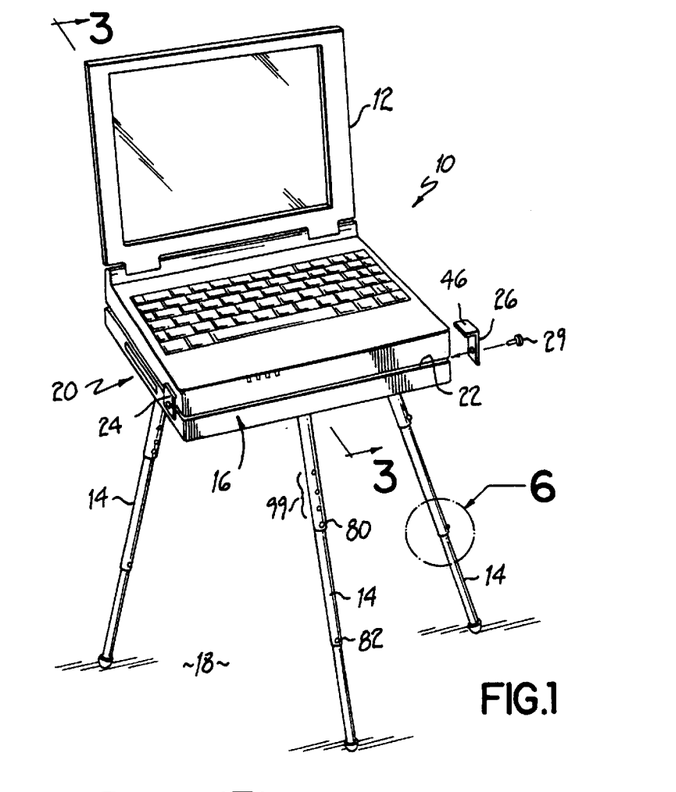
FIG. 1 is a perspective view of a laptop computer supported by a support apparatus consistent with the invention.

Turning to the Drawings, wherein like numbers denote like parts throughout the several views, FIG. 1 illustrates a support apparatus 10 for use in supporting a laptop computer 12 consistent with the invention. Support apparatus 10 includes a plurality of legs 14 removably coupled to a pedestal 16 and used to support the pedestal on a support surface 18, e.g., a floor, a table, or other horizontally-oriented surface.

Portable computer 12, which may include practically any type of transportable computing or other electronic device (e.g., a laptop or notebook computer, a sub-notebook computer, a hand-held computer, a palm-type computer, etc.), is supported on an upper support surface 22 of pedestal 16, which is typically planar in configuration. Portable computer 12 may simply rest on support surface 22, or in the alternative, may be removably secured thereto, e.g., via one or more brackets, such as brackets 24, 26.

Figure 2:
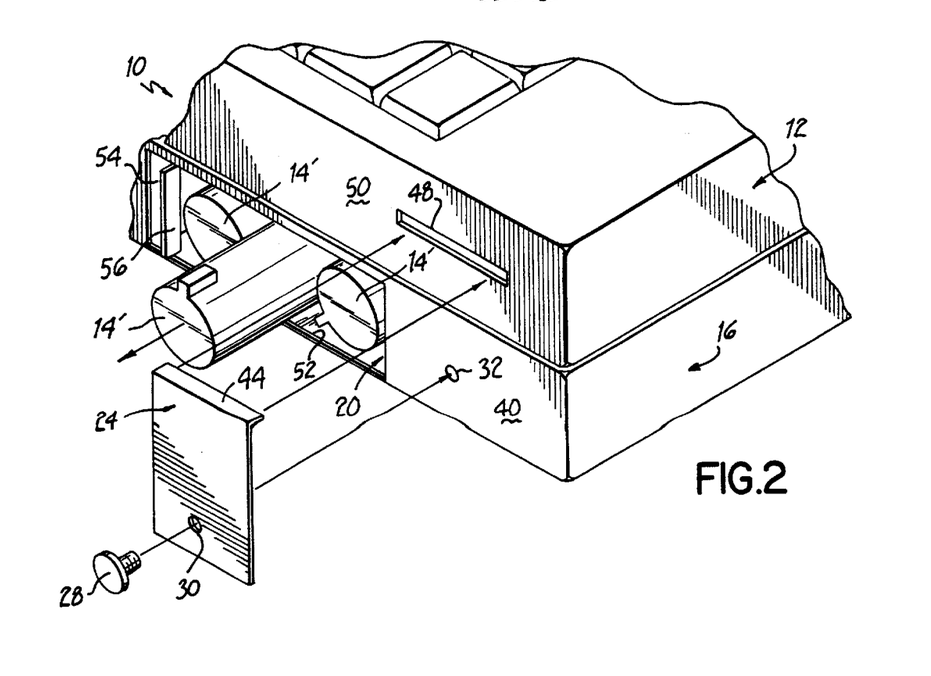
FIG. 2 is a partially-exploded fragmentary perspective view of the support apparatus of FIG. 1, with the legs thereof shown in storage positions within a storage compartment in the support apparatus.

As best shown in FIG. 2, brackets 24, 26 are secured to pedestal 16 via threaded fasteners, e.g., for bracket 24, a threaded fastener 28 projecting through a mounting aperture 30 and engaging a threaded recess 32 in a sidewall 40 of the pedestal (see also fastener 29 for bracket 26 in FIG. 1). Each bracket 24, 26 includes an angled tab 44, 46 that engages a shoulder or notch on the corresponding side wall of laptop computer 12, e.g., for bracket 24, a shoulder 48 formed on side wall 50.

Each threaded fastener is preferably selected to be capable of being quickly fastened and unfastened from pedestal 16 to facilitate setup and breaking down of the support apparatus. For example, each threaded fastener 28, 29 may be a thumbscrew or the like. A fastener consistent with the invention may also be manipulated through the use of a tool, e.g., a flat-head, Phillips-head, hex-head or Torx-head screw or bolt that is manipulatable by a screwdriver, an Allen wrench or a dedicated tool provided with the apparatus.

Pedestal 16 of support apparatus 10 includes a storage compartment 20 forming an inner chamber within the pedestal. External access to storage compartment 20 is provided through an opening 52 formed in external wall 40 of the pedestal. This storage compartment is used to retain a plurality of legs in storage positions illustrated at 14' in FIG. 2. External access to this storage compartment is restricted through the use of a door 54 that in this embodiment is configured to slide between open and closed positions to selectively restrict access to the storage compartment through opening 52. A tab 56 extends outwardly at a right angle from the surface of sliding door 54 to facilitate user manipulation of the door. In addition, one or more detents (not shown) may be utilized in connection with door 54 to maintain the door in either or both of its open and closed positions.

Figure 3:
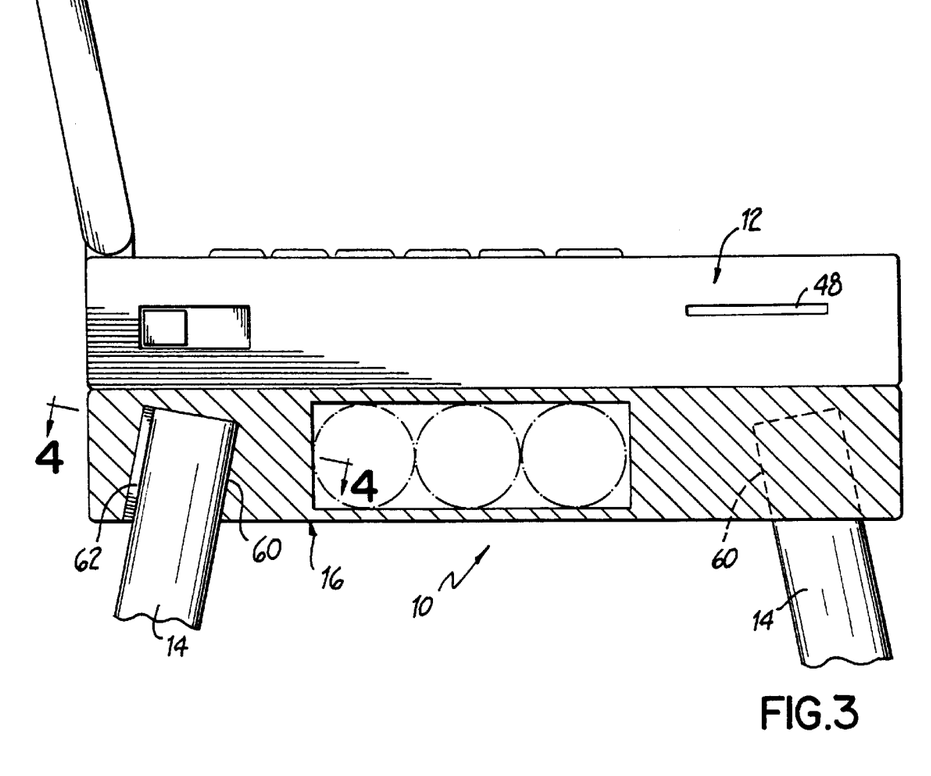
FIG. 3 is a partial cross-sectional view of the support apparatus of FIG. 1, taken through lines 3—3 thereof.

Turning to FIG. 3, each leg 14 is removably coupled to pedestal 16 via a corresponding recess 60 formed in the bottom surface of pedestal 16. Each recess 60 is angled in such a manner to separate the distal ends of each leg to provide a more sturdy footprint for the pedestal, e.g., with each leg projecting in space from a common point along a central, vertically-oriented axis defined through the pedestal. It should be appreciated that any number of legs and corresponding recesses, as well as any suitable leg orientation, may be used in the alternative.

Figure 4:
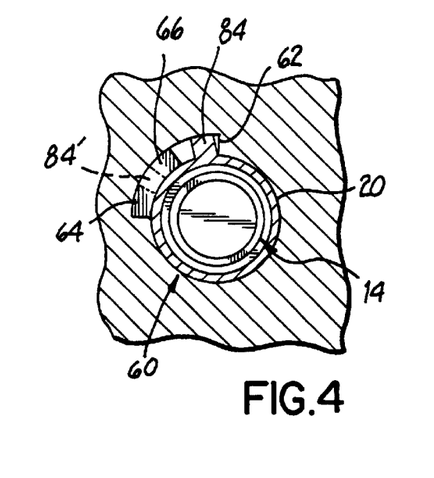
FIG. 4 is a cross-sectional view illustrating an interconnection between a leg and one of the recesses in the support apparatus of FIG. 3, taken through lines 4—4 thereof.

As shown in FIGS. 3 and 4, each recess 60 is circular in cross-section, including a longitudinal slot 62 extending parallel to the direction of insertion of a leg into the recess. An annular slot 64 extends roughly 90 degrees about the longitudinal axis of the recess and in a direction generally perpendicular to longitudinal slot 62, and defines a shoulder 66.

Each leg 14 has a circular cross-section that roughly matches that of the corresponding recess 60, with a longitudinally-extending tab 84 formed along the outer wall of a mounting section 70 thereof. During insertion of a leg in to a recess, tab 84 aligns with longitudinal slot 60. Once the leg is fully received within the recess, tab 84 also aligns with annular slot 64. Consequently, a twisting force may then be applied to rotate the leg in a clockwise direction (when viewed from the bottom of the pedestal) to transpose the tab 84 through the annular slot 64, e.g., to the position shown at 84'. In this position, the tab engages shoulder 66 of annular slot 64 to securely retain the leg within the recess. Removal of the leg then requires merely a counter-clockwise twisting force be applied to return the tab to a position coextensive with longitudinal slot 62, followed by withdrawal of the leg from the recess.

It should be appreciated that various detent mechanisms may be utilized to prevent the inadvertent rotation of the leg between an engaged and disengaged position in the recess. Moreover, various alternate securing mechanisms, e.g., the use of additional cooperating tabs and annular slots, as well as a different position of each longitudinal and/or annular slot in the recess, may also be used.

Figure 5:
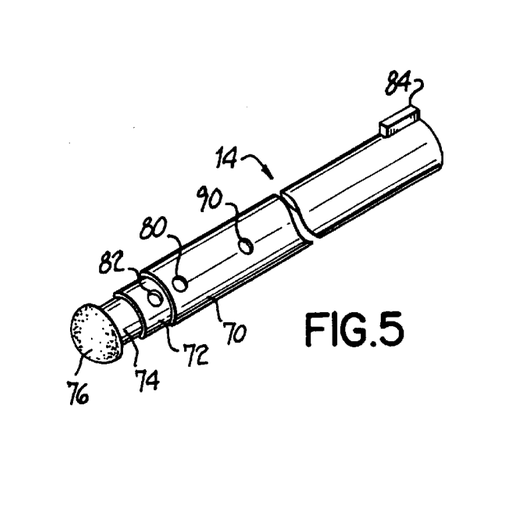
FIG. 5 is a perspective view of one of the legs in the support apparatus of FIG. 1, shown in a collapsed configuration.
Figure 6:
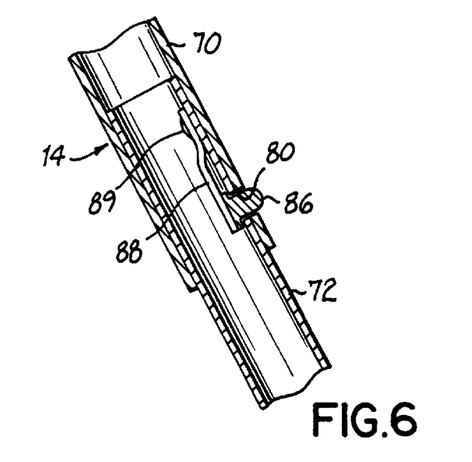
FIG. 6 is an enlarged cross-sectional view of a portion of one of the legs in the support apparatus of FIG. 1.

As shown in FIG. 5, each leg 14 includes a plurality of elongate sections, here sections 70, 72 and 74, arranged in a telescoping arrangement. A foot 76, e.g., formed of rubber or another non-slip material, may be disposed at the distal end of elongate section 74. A pair of locking mechanisms are respectively utilized to selectively permit the relative movement of sections 70 and 72, and 72 and 74 to extend the leg between a collapsed and extended position. As shown in FIG. 6, for example, the locking mechanism between sections 70 and 72 includes a locking aperture 80 formed in section 70 that engages a pin 86 disposed at the free end of a leaf spring 88. The leaf spring 88 is in turn secured via a rivet 89 to an inner surface of section 72. An identical mechanism may also be used between sections 72 and 74 (an aperture 82 therefor is shown in FIG. 5). With this configuration, expansion of a leg from a collapsed to an extended configuration merely requires that each of sections 72, 74 be withdrawn from the corresponding sleeves formed by sections 70, 72 until the spring-loaded pin (e.g., pin 86) engages with the corresponding aperture 80, 82. Then, to collapse a leg, a user is required to depress each spring-loaded pin to disengage the pin from the corresponding aperture 80, 82, and then retract each section 72, 74 back into the sleeve formed by the mating section 70, 72.

In use, therefore, support apparatus 10 may be transported along with the portable computer with its legs stored in a storage position within the storage compartment of the pedestal, as generally shown in FIG. 2. Then, to use the support apparatus in an operative manner, external access to the storage compartment is obtained by opening door 54, thereby permitting the removal of each leg from the storage compartment.

Next, each leg is subsequently inserted into its corresponding recess 60 in the pedestal, with each leg twisted to an engaged position in which the tab thereon engages the shoulder of the annular slot in the recess (FIG. 4). Once all legs have been inserted in this manner, each leg may then be extended to an operative, extended position through the use of the locking mechanisms formed by the spring-loaded pins and corresponding apertures (e.g., pin 86 and 80 of FIG. 6).

Subsequently, a portable computer is placed on the support surface defined by the pedestal, and optionally secured to the pedestal through brackets 24, 26 (FIG. 1).

To disassemble the support apparatus, e.g., for transportation, the portable computer is removed from the support surface, including disengaging brackets 24, 26 (if used). Each leg is collapsed and removed from the cooperating recess in the pedestal, and each leg, once in a collapsed position, is returned to the storage compartment. The door to the storage compartment is then closed, resulting the support apparatus being collapsed into a compact unit.

It should also be appreciated that, if desired, space for brackets 24, 26, as well as any threaded fasteners or tools, may also be provided within storage compartment 20. Each threaded fastener may also be secured within its associated recess in the sidewall of the pedestal during transportation in the alternative.

It will be appreciated that a wide variety of modifications may be made to the illustrated embodiments without departing from the spirit and scope of the invention.

Figure 7:
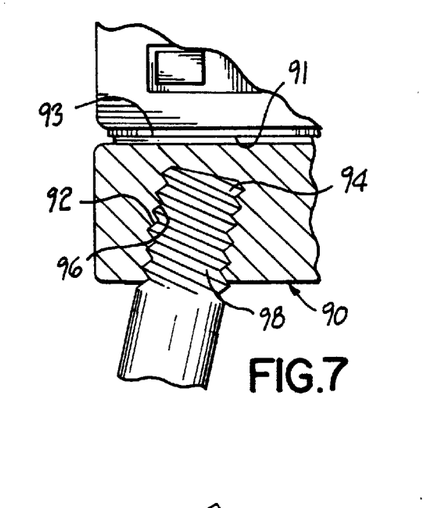
FIG. 7 is a cross-sectional view of an alternate threaded interconnection between a leg and a pedestal recess to that shown in FIGS. 3 and 4.

For example, different mechanisms for securing each leg to the pedestal may be used in the alternative. As shown, for example, in FIG. 7, a threaded engagement mechanism may be used, where a pedestal 90 having a recess 92 engages a leg 94 through cooperating threads 96, 98.

Figure 15:
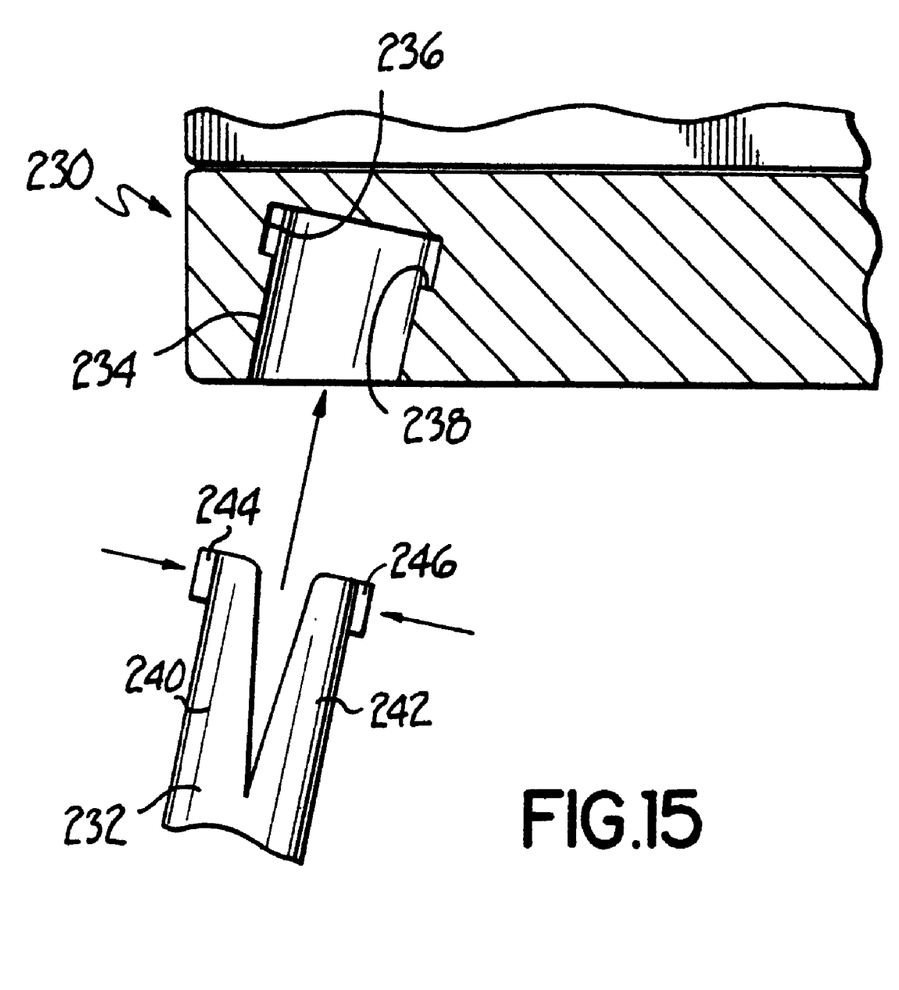
FIG. 15 illustrates another alternate interconnection between a leg and a pedestal recess consistent with the invention.

As another example, FIG. 15 illustrates a pedestal 230 that receives a leg 232 within a recess 234 having two or more transversely-extending slots 236 that define two or more engagement shoulders 238. Each leg 232 includes at least two cooperating resilient elongate fingers 240, 242 respectively terminating with engagement tabs 244, 246. To insert a leg into a recess, therefore, a compressive force is applied to fingers 240, 242 to permit the tabs 244, 246 to be received within recess 234. Then, upon further insertion of the leg into the recess, the tabs become aligned with the slots, permitting the fingers to spring outwardly upon release of the compressive force to engage the tabs within the slots. Removal of a leg similarly requires a compressive force to be applied to the fingers to permit the tabs to be withdrawn through the recess. It should be appreciated that the cross-sectional profile of each recess 234 and leg 232 may also be configured to restrict rotation or other movement of the leg while the leg is engaged within the recess.

A multitude of other mechanisms that are capable of removably securing an elongate member to a support member may be used in the alternative.

A wide variety of different leg designs may also be utilized in the alternative. For example, it may be desirable in many instances to permit the relative length of each leg to be adjusted, e.g., to tilt the working surface of the laptop from a purely horizontal orientation, to support the laptop on a non-horizontal support surface, or to permit the support apparatus to be used at different heights (such as on a table or on a floor). The configuration of each leg 14 shown in FIG. 5 does permit limited length adjustment, as only of one the two pairs of sections may be extended if desired. To provide greater adjustment flexibility, on the other hand, it may be desirable to provide multiple locking apertures at different positions along the longitudinal axis of each section, as represented by apertures 99 in FIG. 1.

Figures 8, 9:
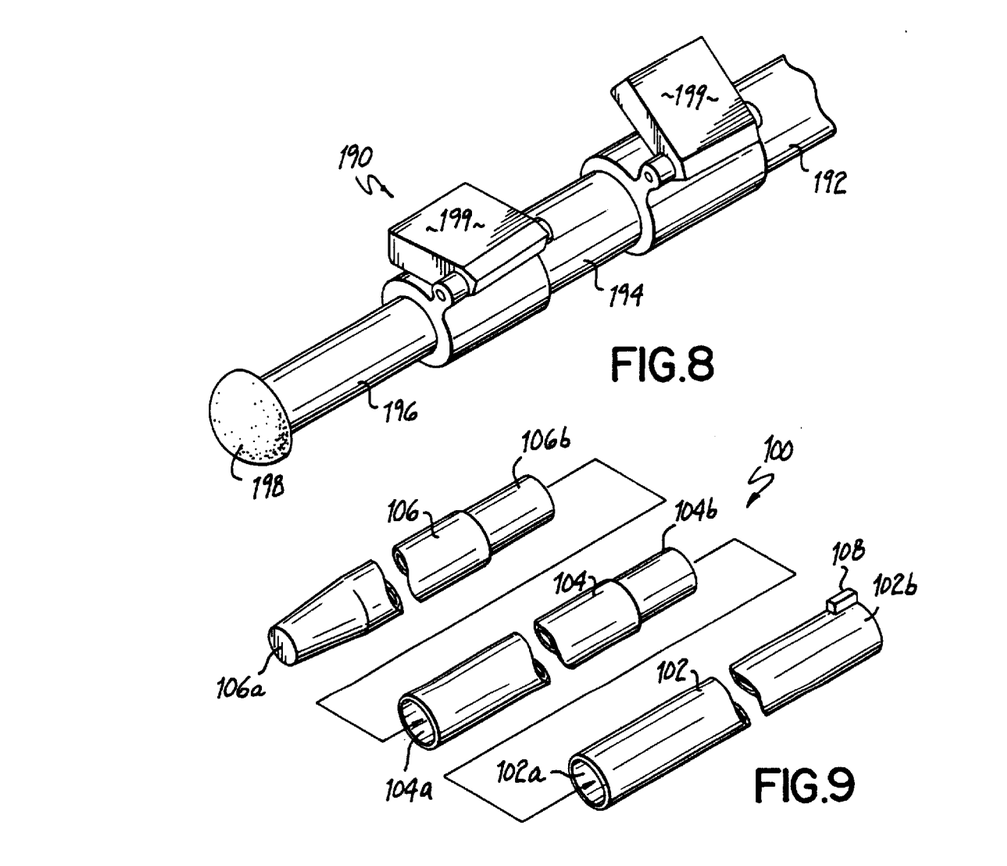
FIG. 8 is a perspective view of an alternate leg configuration consistent with the invention.
FIG. 9 is an exploded perspective view of yet another leg configuration consistent with the invention.

Moreover, in other embodiments, more continuous length adjustment may be provided, e.g., through the use of thumbscrews, annular compression clamps or the like. For example, as shown in FIG. 8, an alternate leg 190 is shown including a plurality of sections 192, 194, 196 and a foot 198. A compression clamp 199 is mounted to each of sections 192, 194 to selectively restrict the relative movement of the corresponding sections 194, 196 retained therein. A multitude of other mechanisms for providing an adjustable length leg may be used in the alternative.

As another alternative, rather than having multiple sections that are permanently secured in a telescoping arrangement, a leg may have sections that are fully removable from one another. As shown, for example, in FIG. 9,, a leg 100 may include multiple sections 102, 104, 106 that are releasably secured to one another through mating bell and spigot interconnections. Each section 102, 104 includes a first end 102a, 104a forming an outer sleeve portion having a predetermined inner diameter. Likewise, each section 104, 106 includes a second end 104b, 106b forming an inner sleeve portion having an outer diameter that is slightly larger than the inner diameter at the first of the corresponding mating leg section. Section 102 further includes a tab 108 disposed at a second end 102b thereof, and section 106 includes a leg defined at the first end 106a thereof, which may or may not include a non-slip material disposed thereon. As another alternative, each leg may also include an elastic "shock" cord that extends through each section 102, 104, 106 to facilitate the engagement of the sleeve portions of each section.

Figure 13:
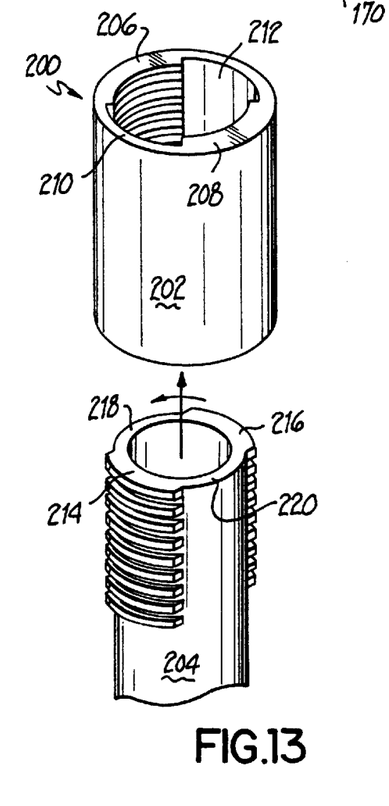
FIG. 13 is an exploded perspective view of another leg configuration consistent with the invention.
Figure 14:
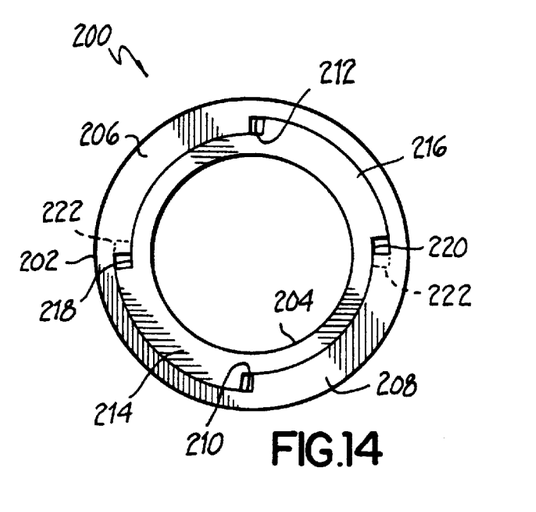
FIG. 14 is a top plan view of the leg of FIG. 13.

Other mechanisms, e.g., threaded interconnections, may be used to join multiple separate leg sections to one another in the alternative. For example, as shown in FIGS. 13 and 14, a leg 200 includes a pair of cooperating sections 202, 204 capable of being joined through the use of cooperating threads. At least the end 202a of leg section 202 is provided with opposing sets of internal threads 206, 208 separated by opposing unthreaded channels 210, 212, effectively dividing the inner cross-section of the leg section into four quadrants. At the end 204a of leg section 204, opposing sets of external threads 214, 216 are separated by opposing unthreaded channels 218, 220. As is best shown in FIG. 14, each set of threads 206, 208, 214 and 216 occupies slightly less than 90 degrees to permit a user to freely slide leg portion 204 into leg portion 202 to a desired distance, with thread sets 206, 208, 214 and 216 respectively received within channels 218, 220, 210 and 212. A quarter turn of leg section 204 relative to leg section 202 engages the thread sets to lock the leg sections together with a desired length. If desired, one or more stops 222 may also be disposed on either or both of leg sections 202, 204 to limit the rotation of the leg sections beyond a locked orientation. Moreover, it may be desirable to orient the threads in each set of thread slightly upward to permit the weight of the portable computer and pedestal to resist the disengagement of the respective thread sets.

Furthermore, in other alternative embodiments, different numbers of elongate sections may be utilized. Moreover, alternate mechanisms of providing adjustable-length elongate member may be used for each leg. In addition, any or all of the legs may have a fixed or adjustable length when in an operative position. Other modifications will be apparent to one of ordinary skill in the art.

Figure 10:
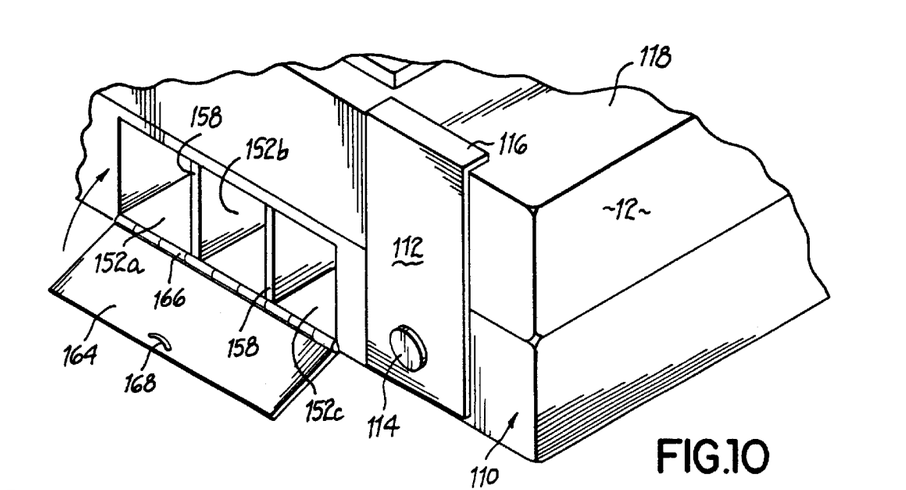
FIG. 10 is a partially-exploded fragmentary perspective view of another support apparatus consistent with the invention, illustrating alternate storage compartment, door and securing mechanism configurations to those shown in FIG. 2.

A wide variety of alternate mechanisms may also be used to secure a portable computer to a pedestal. For example, as shown in FIG. 10, portable computer 12 may be secured to a support apparatus 110 through the use of a bracket 112 that is secured to the support apparatus 110 by a threaded fastener 114, and which includes an angled tab 116 that extends over and engages an upper surface 118 of the portable computer. In such a configuration, no specific shoulder or notch need be defined in the side wall of the portable computer. It should also be appreciated that different numbers of brackets, as well as different locations around the perimeter of the laptop computers may also be used in the alternative. Moreover, while the embodiments illustrated herein illustrate a pedestal that has a length and width that substantially match that of the base of a portable computer, the length and width or any other dimension of the pedestal need not correspond to that of the portable computer. In particular, it may be desirable to configure a pedestal to operate with multiple types and brands of portable computers, each of which may have different external dimensions.

Figure 11:
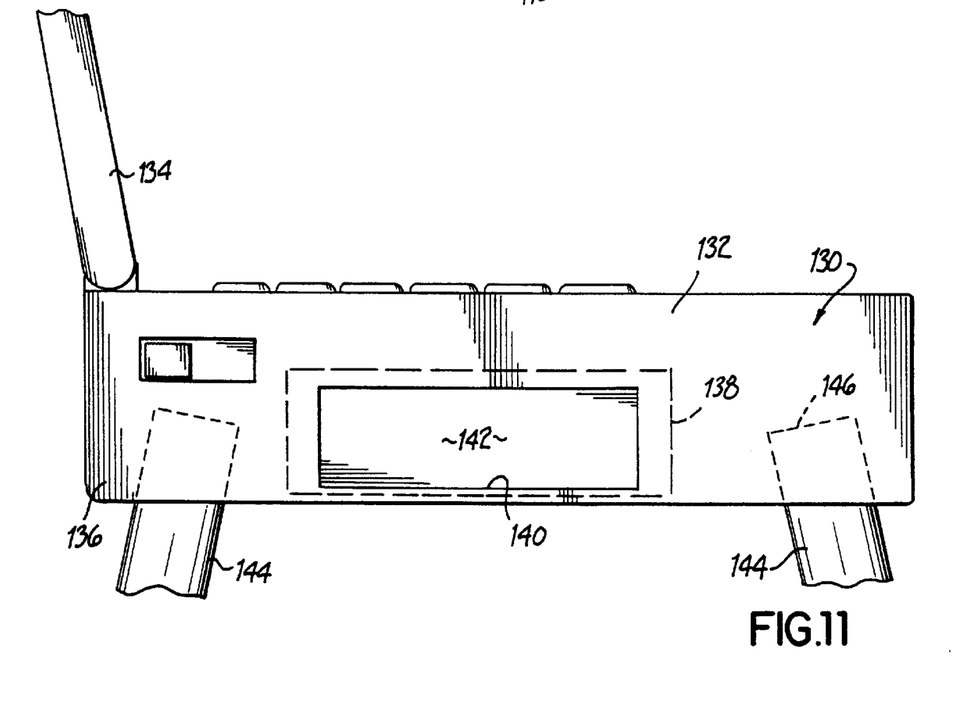
FIG. 11 is a fragmentary side elevational view of a laptop computer incorporating an integrated support apparatus consistent with the invention.

As another alternative, hook and loop fastener (e.g., as shown at 91, 93 in FIG. 7), as well as adhesives, tapes and the like, may also be used in lieu of or in addition to brackets to either permanently or temporarily secure a portable computer to a pedestal consistent with the invention. In addition, as shown in FIG. 11, it may also be desirable to integrate a support apparatus into a laptop computer itself. For example, a laptop computer 130 including a base 132 and a display panel 134 is shown having a support apparatus portion 136 including a storage compartment 138 having an opening 140 selectively closed by a door 142. A plurality of legs 144 are shown secured within recesses 146 in the same manner as discussed above for support apparatus 10.

In addition, a storage compartment may take a number of alternate configurations. For example, returning to FIG. 10, support apparatus 110 is shown with a storage compartment 152 having a plurality of partitions 158 that partition the compartment into a plurality of slots 152a, 152b and 152c for individually receiving each removable leg. It should also be appreciated that multiple storage compartments may be provided within the support apparatus to receive one or a subset of the legs used by the apparatus. Each compartment may be jointly accessible through a common opening, as in FIG. 10, or in the alternative, may be accessible through a separate, dedicated opening.

Also, as further shown in FIG. 10, various alternate closure mechanisms may be utilize to selectively permit external access to a storage compartment. Support apparatus 110, a hinged door 164 that is mounted to the support apparatus via one or more hinges 166, and retained in a closed position by a latch 168. It should be appreciated that more than one door may be utilized to effect closure of a storage compartment, and that other known door designs may be used in the alternative.

Figure 12:
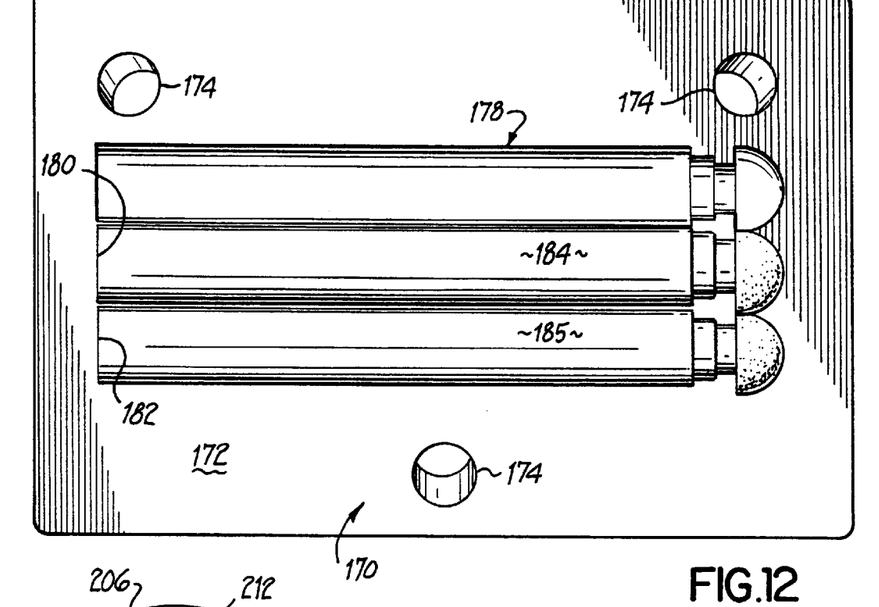
FIG. 12 is a bottom plan view of an another support apparatus consistent with the invention, and incorporating an externally-located storage compartment formed in the bottom of the pedestal thereof.

Furthermore, it should be appreciated that a storage compartment consistent with the invention need not form an inner chamber within the support apparatus. Instead, a storage compartment may be defined by one or more recesses formed within an external wall of the support apparatus. As shown in FIG. 12, for example, a support apparatus 170 has a pedestal with a bottom surface 172 within which is formed a plurality of recesses 174 for use in removably coupling a plurality of legs to the pedestal. A storage compartment 176, including a plurality of recesses 178, 180 and 182, is formed in the bottom surface 172. To removably couple a plurality of legs (e.g., legs 184 and 185) into recesses 178, 180 and 182, various snap-fit or detent mechanisms (not shown), which are generally well known in the art, may be utilized within each recess 178, 180, 182. Consequently, in this configuration, a user is permitted to snap each leg into its cooperating recess in the storage position, and to remove such a leg from the recess by prying the leg from the detents formed by the associated snap-fit mechanisms.

The pedestal and legs in a support apparatus consistent with the invention may also be constructed of any number of materials, e.g., various plastics and/or metals In one embodiment, for example, the pedestal may be injection molded from a durable and lightweight plastic material.

Additional modifications may be made to the illustrated embodiments without departing from the spirit and scope of the invention. Therefore, the invention lies in the claims hereinafter appended.

What is claimed is:

1. A support apparatus for a portable computer, comprising:
   (a) a plurality of legs; and
   (b) a pedestal configured to support a portable computer, the pedestal further configured to removably couple with the plurality of legs to arrange the legs in an operative position to support the pedestal on a supporting surface, the pedestal including at least one storage compartment configured to store at least one of the plurality of legs in a storage position.

2. The support apparatus of claim 1, wherein the pedestal has a length and width that are substantially coextensive with that of a base of the portable computer.

3. The support apparatus of claim 1, wherein the pedestal includes a generally planar support surface adapted to support the portable computer.

4. The support apparatus of claim 1, further comprising at least one bracket coupled to the pedestal and configured to secure the pedestal to the portable computer.

5. The support apparatus of claim 4, wherein the bracket includes a tab configured to engage a longitudinal shoulder formed along a side surface of the portable computer.

6. The support apparatus of claim 1, wherein the pedestal is integrated into a base of the portable computer.

7. The support apparatus of claim 1, wherein each leg has an adjustable length.

8. The support apparatus of claim 7, wherein each leg includes at least first and second elongate members coupled to one another in a telescoping arrangement.

9. The support apparatus of claim 1, wherein the pedestal includes a plurality of recesses formed in a bottom surface of the pedestal, each recess configured to receive and secure a leg to the pedestal in the operative position.

10. The support apparatus of claim 9, wherein each recess includes a longitudinal slot extending from an opening of the recess and an annular slot extending perpendicular to the longitudinal slot, and wherein each leg includes a tab adapted to engage the longitudinal slot during insertion of the leg into the recess, and to engage the annular slot to secure the leg to the pedestal in response to a twisting force applied to the leg while inserted in the recess.

11. The support apparatus of claim 1, wherein the storage compartment includes an inner chamber defined within the pedestal and having an opening defined in at least one external wall of the pedestal.

12. The support apparatus of claim 11, wherein the storage compartment includes a door covering the opening to the inner chamber.

13. The support apparatus of claim 1, wherein the storage compartment includes a recess defined within an external wall of the pedestal.

14. A portable computer, comprising:

(a) a base coupled to a display panel;

(b) a plurality of legs removably coupled to the base, each leg having an operative position for use in supporting the base on a supporting surface; and (c) at least one storage compartment disposed in the base and configured to store at least one of the plurality of legs when not in the operative position thereof.

15. A method of using a portable computer, the method comprising:

(a) removing a plurality of legs from at least one storage compartment defined on a pedestal;

(b) removably coupling the plurality of legs to the pedestal;

(c) placing the plurality of legs on a support surface; and (d) placing a portable computer on the pedestal.

16. The method of claim 15, further comprising:

(a) removing the plurality of legs from the pedestal; and (b) storing the plurality of legs back in the storage compartment.

17. The method of claim 16, further comprising adjusting the length of at least one leg to vary the height of the pedestal from the support surface.

18. The method of claim 15, further comprising securing the portable computer to the pedestal.

19. The method of claim 18, wherein securing the portable computer to the pedestal includes engaging the portable computer with a bracket secured to the pedestal.

20. The method of claim 15, wherein removably coupling the plurality of legs to the pedestal includes inserting each leg into a corresponding recess formed in a bottom surface of the pedestal.

21. The method of claim 15, wherein the storage compartment includes an inner chamber defined within the pedestal and having an opening defined in at least one external wall of the pedestal, wherein removing the legs from the storage compartment includes opening a door covering the opening to the inner chamber.

* * * * *